(12) United States Patent
Wang et al.

(10) Patent No.: US 8,632,267 B2
(45) Date of Patent: Jan. 21, 2014

(54) CARBON RIBBON RECOVERY DEVICE AND A PRINTER HAVING THE SAME

(75) Inventors: Zhaoyi Wang, Shandong (CN); Jian Yang, Shandong (CN)

(73) Assignee: Shandong New Beiyang Information Technology Co., Ltd., Shandong (CN)

( * ) Notice: Subject to any disclaimer, the term of this patent is extended or adjusted under 35 U.S.C. 154(b) by 498 days.

(21) Appl. No.: 12/933,682

(22) PCT Filed: Dec. 11, 2008

(86) PCT No.: PCT/CN2008/073454
§ 371 (c)(1),
(2), (4) Date: Sep. 20, 2010

(87) PCT Pub. No.: WO2009/117890
PCT Pub. Date: Oct. 1, 2009

(65) Prior Publication Data
US 2011/0026996 A1      Feb. 3, 2011

(30) Foreign Application Priority Data

Mar. 26, 2008   (CN) .......................... 2008 1 0084082

(51) Int. Cl.
*B41J 33/00*   (2006.01)
*B41J 33/12*   (2006.01)

(52) U.S. Cl.
USPC .......................................... 400/223; 400/236

(58) Field of Classification Search
USPC ........... 400/223, 234, 235, 235.1, 236, 236.1, 400/246; 242/343
See application file for complete search history.

(56) References Cited

U.S. PATENT DOCUMENTS 4,043,149 A * 8/1977 Tuninetti ........................ 464/46

(Continued)

FOREIGN PATENT DOCUMENTS

CN    2401461 Y    10/2000
CN    2832530 Y    11/2006

(Continued)

OTHER PUBLICATIONS

International Search Report for PCT/CN2008/073454 dated Mar. 12, 2009.

*Primary Examiner* — Matthew G Marini
*Assistant Examiner* — Marissa Ferguson Samreth
(74) *Attorney, Agent, or Firm* — Nixon Peabody LLP; Joseph Bach, Esq.

(57) ABSTRACT

A carbon ribbon recovery device includes a carbon ribbon supply roller (100) and a carbon ribbon recovery roller (200). The carbon ribbon recovery roller (200) includes a first clutch plate (211), a second clutch plate (212), a friction element (213), a recovery gear (214) and a spindle (215); the spindle (215) is provided on a frame (400) of a printer to support a carbon ribbon (700); the first clutch plate (211), the second clutch plate (212), the friction element (213) and the recovery gear (214) are arranged in turn on the spindle (215), the first clutch plate (211) rotates in synchronism with the spindle (215); the recovery gear (214), the friction element (213) and the second clutch plate (212) can rotate around the spindle (215); the recovery gear (214) is rotated by a carbon ribbon driving device (300), and to drive the friction element (213) rotating, then to proceed to give the second clutch plate (212) a rotating force in the same direction; the second clutch plate (212) is matched with the first clutch plate (211) when the second clutch (212) rotates in a predetermined direction; the second clutch plate (212) is not matched with the first clutch plate (211) when the second clutch (212) rotates in a direction opposed to the predetermined direction. The present invention also relates to a thermal transfer printer having the carbon recovery device.

19 Claims, 4 Drawing Sheets

(56) References Cited

U.S. PATENT DOCUMENTS 5,284,396 A     2/1994   Masumura et al.
5,820,279 A *  10/1998   Lodwig et al. ................ 400/234
6,637,957 B2 * 10/2003   Mastinick et al. ............ 400/223

FOREIGN PATENT DOCUMENTS

| JP | 1-275177 A | 11/1989 |
| JP | 2-305681 A | 12/1990 |
| JP | 3-211075 A | 9/1991 |

* cited by examiner

CARBON RIBBON RECOVERY DEVICE AND A PRINTER HAVING THE SAME

RELATED APPLICATIONS

This application is a National Phase of International Application No. PCT/CN2008/073454, entitled "A CARBON RIBBON RECOVERY DEVICE AND A PRINTER HAVING THE SAME", which was filed on Dec. 11, 2008, and which claims priority of Chinese Patent Application No. 200810084082.7 filed with the Chinese Patent Office on Mar. 26, 2008 and entitled "A Carbon Ribbon Recovery Device for Thermal Transfer Printer", and the disclosures of which are hereby incorporated by reference herein in their entirety.

FIELD OF THE INVENTION

The present invention relates to the mechanical field, in particular, to a carbon ribbon recovery device and a printer having the same.

BACKGROUND ART

It is well-known that the printing principle of the thermal transfer printer is: when the printing head is heated, the dye on the carbon ribbon is transferred onto the printing medium. Such a mode makes the storage time of the printed ticket and paper much longer than the thermal printing paper. Therefore, the thermal transfer printer is widely used in the ticket printing fields such as highway, railway, telecom, clothing and others.

Currently, the carbon ribbon recovery device of the thermal transfer printer at least has the following problems:

1. The retraction of the carbon ribbon and the ticket paper is not synchronized, and thus the ticket surface is wiped black by the carbon ribbon;
2. The carbon ribbon is easy to be wrinkled, which results in reduced printing quality; and
3. The recovery of the carbon ribbon is not reliable, and the carbon ribbon is relaxed, which affects the feed and printing quality, etc.

In order to solve the above problems, a Chinese patent (the application No. is CN200520122035.9) discloses a carbon ribbon recovery device for a thermal transfer ticket-making machine. The device is mainly composed of a front carbon ribbon roller retracting device and a rear carbon ribbon roller releasing device. The front carbon ribbon roller retracting device is composed of modules such as a sleeve tube, an adjusting sleeve, a front carbon ribbon roller, press springs, an outer friction plate, a left friction plate of gearwheels, gearwheels, a sliding sleeve, a bearing, a front carbon ribbon roller seat, a front carbon ribbon roller, a sliding block, a protrusion top, plate springs, a hand-push handle, etc.; and the rear carbon ribbon roller releasing device is mainly composed of modules such as a clip ring, a rear carbon ribbon roller, a bearing, torsion springs, a rear carbon ribbon roller positioning sleeve, an inner friction plate, an outer friction plate, a shaft sleeve, a rear carbon ribbon roller, a spring steel plate, a sliding plate, press springs, a rear carbon ribbon roller end sleeve, etc.

It is obvious that the above device has a large number of parts, the assembly is quite complex and the costs are very high.

SUMMARY OF THE INVENTION

Thus, the present invention aims at providing a carbon ribbon recovery device and a printer having the same which solve the problems of numerous parts and complex assembly in the conventional technology.

The present invention is realized in the way as follow:

A carbon ribbon recovery device for a thermal transfer printer comprises a carbon ribbon supply roller, a carbon ribbon recovery roller and a carbon ribbon driving device. The carbon ribbon recovery roller comprises:

a first clutch plate, a second clutch plate, a friction element, a recovery gear and a spindle;

wherein the spindle is provided on a frame of a printer to support a carbon ribbon, the first clutch plate, the second clutch plate, the friction element and the recovery gear are arranged in turn on the spindle;

the first clutch plate rotates synchronously with the spindle;

the recovery gear, the friction element and the second clutch plate can rotate around the spindle;

the recovery gear is rotated by the carbon ribbon driving device to drive the friction element to rotate, then to provide the second clutch plate with a rotating force in the same direction;

the second clutch plate is matched with the first clutch plate when the second clutch plate rotates in a predetermined direction, and the second clutch plate breaks away from the matched state with the first clutch plate when the second clutch plate rotates in a direction opposed to the predetermined direction.

Preferably, the first clutch plate is provided with at least one high point and one low point and the transition between the high point and low point is uniform to form a first curved surface; the second clutch plate is provided with at least one high point and the transition between the high point and low point is uniform to form a second curved surface; and the first curved surface and the second curved surface are matched with one another.

Preferably, one end of the spindle adjacent to the carbon ribbon only supports one end of the carbon ribbon core.

Preferably, one end of the spindle adjacent to the carbon ribbon runs through the carbon ribbon core.

Preferably, the friction element is a felt pad.

Preferably, the first clutch plate comprises a first mounting hole, a first end surface and two first curved surfaces;

wherein the two first curved surfaces are connected end to end, and uniformly distributed on the first end surface taking the first mounting hole as the circle center;

the first mounting hole is located at the center of the first clutch plate, and the shape of its cross section is matched with the shape of the spindle.

Preferably, the second clutch plate comprises a second mounting hole, a second end surface and two second curved surfaces;

wherein the two second curved surfaces are connected end to end, and uniformly distributed on the second end surface taking the second mounting hole as the circle center;

the second mounting hole is located at the center of the second clutch plate, and the shape of its cross section is matched with the shape of the spindle.

Preferably, the first curved surface and the second curved surface are helical surfaces or inclined surfaces.

Preferably, the material of the first clutch plate or the second clutch plate is plastic, or metal or alloy having good elastic property.

The embodiments of the present invention also disclose a printer. The present printer distinguishes from the current printers in that it has the above carbon ribbon recovery device.

From the above technical solutions it can be seen that, compared with the conventional technology, the embodiments of the present invention have fewer parts and components, and simple structure, which simplifies the assembly technology and reduces the hardware and labor costs. Besides, the matched structure of the clutch plates characterized by the synchronized rotation when the clutch plates rotate merely in one direction results in a small retraction resistance when the carbon ribbon retracts.

BRIEF DESCRIPTION OF THE ACCOMPANYING DRAWINGS

In order to more clearly illustrate the technical solutions of the embodiments of the present invention or of the prior art, next, the drawings to be used in the embodiments or the prior art will be briefly described. Obviously, the drawings described hereinafter are merely some embodiments of the present invention. Those skilled in the art can also obtain other drawings according to these drawings without involving any innovative effort.

DETAILED DESCRIPTION OF THE INVENTION

The embodiments of the present invention disclose a carbon ribbon recovery device that is composed of fewer parts and improves the synchronization between the carbon ribbon and the printing medium.

In order to make the person skilled in the art better understand the technical solutions of the present invention, the technical solutions of the present invention will be illustrated in detail with reference to the drawings and embodiments.

Figure 1:
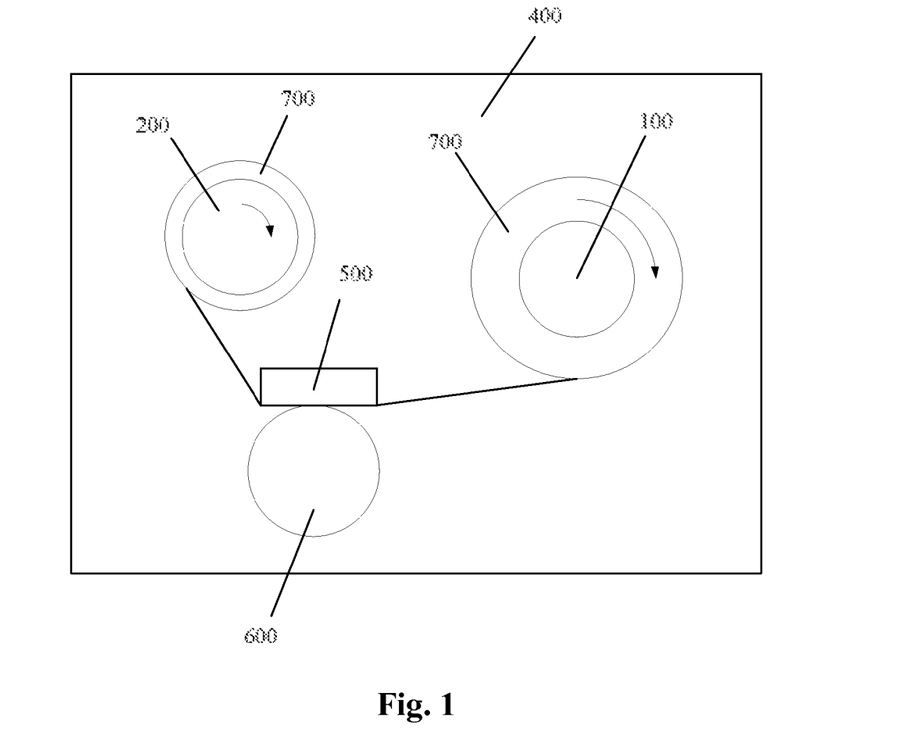
FIG. 1 is a schematic view of the structure of a carbon ribbon recovery device in Embodiment 1 of the present invention.

Please refer to FIG. 1 which is a schematic view of the structure of a carbon ribbon recovery device in Embodiment 1 of the present invention.

This embodiment includes: a carbon ribbon supply roller 100, a carbon ribbon recovery roller 200, a carbon ribbon driving device 300 (not shown in the figure), the carbon ribbon supply roller 100 and the carbon ribbon recovery roller 200 are provided on the frame 400 of the printer, the carbon ribbon is drawn from the carbon ribbon supply roller 100 to pass through the space between the printing head 500 and the printing roller 600, to be wound on the carbon ribbon recovery roller 200.

When the printer works, the carbon ribbon supply roller 100 and the carbon ribbon recovery roller 200 are driven by the carbon ribbon driving device 300 to rotate in the directions shown by the arrows to supply and recover the carbon ribbon 700.

Figure 2:
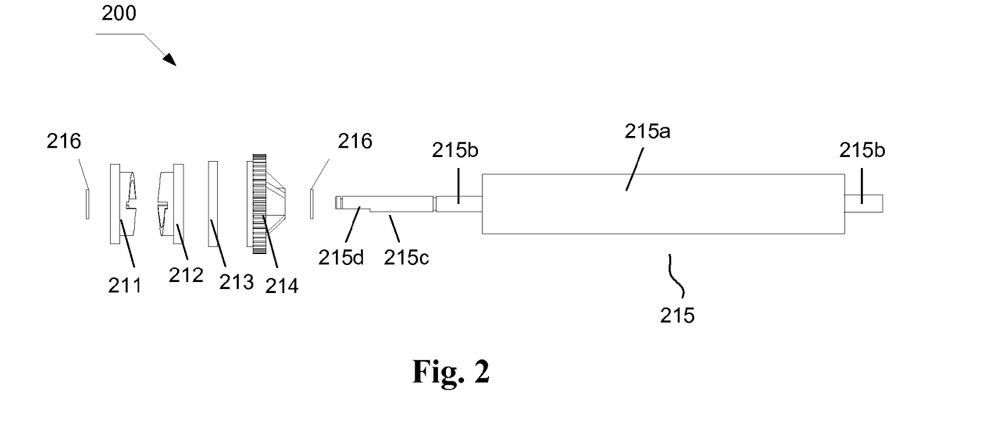
FIG. 2 is a schematic view of the structure of the carbon ribbon recovery roller in the above embodiment.

FIG. 2 shows a schematic view of the first structure of the carbon ribbon recovery roller 200 in the above embodiment.

The carbon ribbon recovery roller 200 comprises: a first clutch plate 211, a second clutch plate 212, a friction element 213, a recovery gear 214 and a spindle 215.

Wherein, the spindle 215 is divided into the spindle center and the spindle body. The spindle body is used for winding and supporting the used carbon ribbon. For the sake of easy description, the spindle body will be uniformly called carbon ribbon supporting shaft 215a in the following text. The spindle center is divided into three portions, namely, the first mounting shaft 215b, the second mounting shaft 215c and the third mounting shaft 215d. Wherein, the first mounting shaft 215b is used to cooperate with the frame 400 of the printer, that is to say, the carbon ribbon recovery roller 200 is mounted on the frame 400 of the printer by means of the first mounting shaft 215b. The recovery gear 214, the friction element 213 and the second clutch plate 212 in turn run through the second mounting shaft 215c and can rotate around the axis of the spindle 215.

The friction element 213 rotates synchronously with the recovery gear 214 when the recovery gear 214 rotates, and provides the second clutch plate 212 adjacent to the friction element 213 with a rotating force in the same direction so as to drive the second clutch plate 212 to rotate synchronously.

The first clutch plate 211 and the third mounting shaft 215d are fixedly connected with both of them being immobile with respect to one another.

In the carbon ribbon recovery roller 200, the position stop element is also provided. The position stop element consists of the position stop portion 216 and the position stop portion 216'.

The two position stop portions (the position stop portion 216 and the position stop portion 216') are respectively disposed on one side of the first clutch plate and one side of the recovery gear 214 towards the carbon ribbon supporting shaft 215a, for restricting the axial movements of the first clutch plate 211, the second clutch plate 212, the friction element 213 and the recovery gear 214 to ensure the positional relations between respective units.

The position stop portion 216 and the position stop portion 216' can be split washers or other elements characterized by the function of position stop. According to the requirements to the functional characteristic, the person skilled in the art can easily come up with other substitute elements.

The friction element 213 can be the friction elements having the frictional function, for instance, the felt pad, and also can be other elements that can rotate with the recovery gear 214 and give the rotating force to the element on the adjacent position. On the basis of this embodiment, the person skilled therein can also easily come up other substitute solutions.

Figure 3:
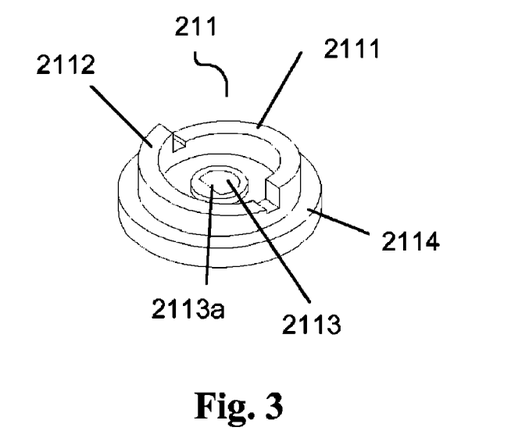
FIG. 3 is a perspective view of the first clutch plate in the above embodiment.

FIG. 3 shows a perspective view of the first clutch plate in the above embodiment.

The first clutch plate 211 comprises a curved surface 2111, a curved surface 2112, a first mounting hole 2113 and an end surface 2114.

Wherein, the curved surface 2111 and the curved surface 2112 are two helical surfaces with the same shape and connected end to end, and uniformly distributed on the end surface 2114 (the end surface 2114 can be a plane surface) taking the first mounting hole 2113 as the circle center. The first mounting hole 2113 is located at the center of the first clutch plate 211 and the shape of its cross section is matched with the shape of the end surface of the third mounting shaft 215d.

The first mounting hole 2113 has such a shape that it can ensure the first mounting hole 2113 and the third mounting shaft 215*d* to be relatively immobile, for instance, arbitrarily irregular shape, or square shape, diamond shape or other regular shapes with exception of the circular shape.

For example, the first mounting hole 2113 is provided with the locating surface 2113*a* to be matched with the locating surface on the third mounting shaft 215*d* so as to make the first clutch plate 211 and the third mounting shaft 215*d* fixedly connected together, and relatively immobile.

Figure 4:
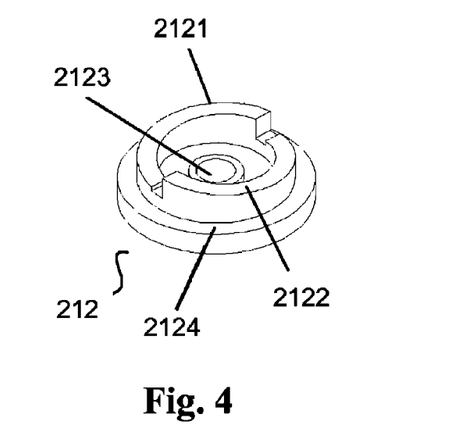
FIG. 4 is a perspective view of the second clutch plate in the above embodiment.

FIG. 4 is a perspective view of the second clutch plate in the above embodiment.

The structure of the second clutch plate 212 is the same as that of the first clutch plate 211, which comprises: a curved surface 2121, a curved surface 2122, a second mounting hole 2123 and an end surface 2124 (the end surface 2124 can be a plane surface). The curved surface 2121 and the curved surface 2122 are two helical surfaces with the same shape and connected end to end, and uniformly distributed on the end surface 2124 taking the second mounting hole 2123 as the circle center.

The second mounting shaft 215*c* runs through the second mounting hole 2123, and the second clutch plate 212 can freely rotate around the axis of the second mounting shaft 215*c*.

It should be indicated that in the other embodiments, the number of the curved surfaces on the end surfaces of the first clutch plate 211 and the second clutch plate 212 can be arbitrary as long as it can satisfy the following condition: the second clutch plate 212 is matched with the first clutch plate 211 when the second clutch plate 212 rotates in a certain predetermined direction, and the second clutch plate 212 is not matched with the first clutch plate 211 when the second clutch plate 212 rotates in the direction opposed to the predetermined direction.

Figure 5:
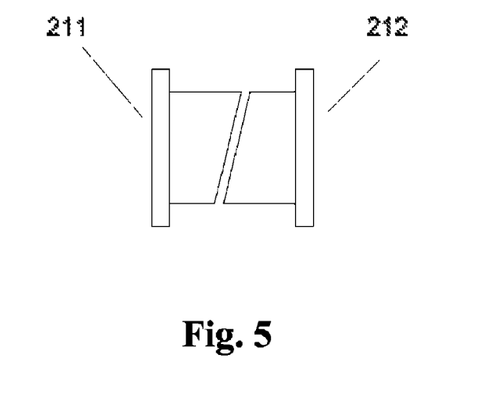
FIG. 5 is a side view of the first clutch plate and the second clutch plate in Embodiment 2 of the present invention.

For example, in the other embodiments, the number of the curved surfaces on the first clutch plate 211 and the curved surfaces on the second clutch plate 212 can be one, respectively, i.e. the end surface of the first clutch plate 211 is merely provided with one high point and one low point, and the transition between the high point and low point is uniform. Likewise, the end surface of the second clutch plate 212 is merely provided with one high point and one low point, and the transition between the high point and low point is uniform. As shown in FIG. 5, it is a side view of the first clutch plate and the second clutch plate in Embodiment 2 of the present invention.

Figure 6:
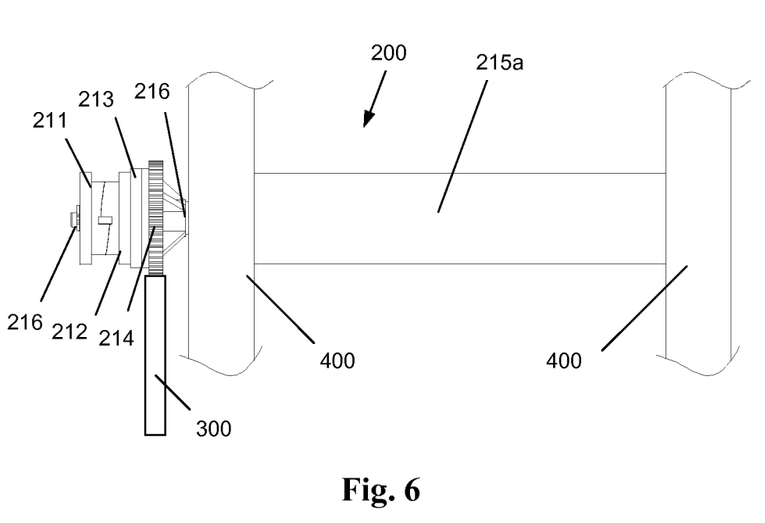
FIG. 6 is an assembly drawing of the above Embodiment 1.

FIG. 6 is an assembly drawing of above Embodiment 1.

In the assembly state, the curved surface 2121, the curved surface 2122, the second mounting hole 2123 and the end surface 2124 of the second clutch plate 212 are opposite to the curved surface 2111, the curved surface 2112, the first mounting hole 2113 and the end surface 2114 of the first clutch plate 211, respectively. The tracks of the curved surface 2111 and the curved surface 2121 are matched; likewise, the tracks of the curved surface 2112 and the curved surface 2122 are matched. Therefore, the first clutch plate 211 and the second clutch plate 212 are matched.

It should be indicated that the curved surfaces of the above first clutch plate 211 and the second clutch plate 212 can also be normal inclined surfaces, or other structures characterized by making the two clutch plates press upon one another when the two clutch plates rotate in a certain direction and by making the two clutch plates break away from one another when they rotate in another direction.

In addition, it should be indicated that, to accomplish the above characteristics, either the above clutch plates (the first clutch plate 211 and the second clutch plate 212) or the friction element 213 is elastic, or both of them are elastic.

Next, the working process and working principle of the embodiments of the present invention will be described in detail with reference to FIG. 1 and FIG. 6:

When the printer works, the carbon ribbon supply roller 100 is rotated by the carbon ribbon driving device 300 to release the carbon ribbon 700. Meanwhile, the carbon ribbon recovery roller 200 starts to work: the recovery gear 214 rotates around the axis in the direction A to drive the friction element 213 to rotate synchronously, then to drive the second clutch plate 212 to rotate. Since the first clutch plate 211 and the second clutch plate are matched, therefore, the rotation of the second clutch plate 212 drives the first clutch plate 211 to rotate. Since the first clutch plate 211 and the spindle 215 are fixedly connected with both of them being immobile with respect to one another, the spindle 215 rotates with the rotation of the first clutch plate 211 to make the used carbon ribbon wound on the carbon ribbon recovery roller 200.

When the carbon ribbon retracts, the recovery gear 214 of the carbon ribbon recovery roller 200 is rotated by the carbon ribbon driving device 300 around the axis in the direction opposite to the direction A (as the direction shown by the arrow in FIG. 1) to drive the friction element 213 to rotate, then to drive the second clutch plate 212 to rotate. The second clutch plate 212 and the first clutch plate 211 break away from the original matched state, and since the first clutch plate 211 or the second clutch plate 212 or the friction element 213 is elastic, at this moment, the first clutch plate 211 does not rotate with the second clutch plate 212, which reduces the resistance when the carbon ribbon retracts, then, the carbon ribbon can easily retract.

In the above embodiment, when the friction element 213 is the friction element such as the felt pad, in order to increase the friction force between the second clutch plate 212 and the friction element, the semidiameter of the end surface 2124 of the second clutch plate 212 is so increased that it appears that there is a step between the end surface 2124 and the curved surfaces 2121 and 2122. It should be indicated herein that the specific shape of the end surface is not limited in the present invention. According to the embodiments of the present invention, the person skilled therein, without involving innovative effort, can modify the end surface correspondingly.

Figure 7:
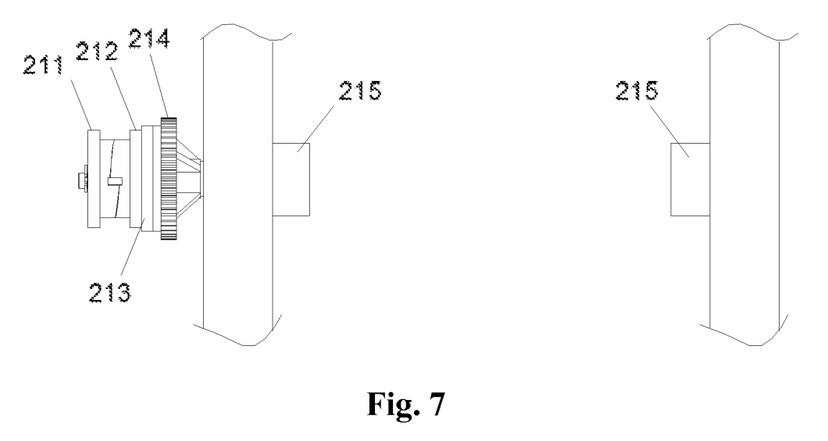
FIG. 7 is an assembly drawing of the carbon ribbon recovery roller in Embodiment 3 of the present invention.

It should be pointed out that the shape and construction of the spindle is not limited in the present invention. It can be divided into two sections: one section is mounted with the transmission elements such as the first clutch plate, the second clutch plate, the friction pad and the recovery gear; and the other section can be disposed as a long shaft to run through the carbon ribbon core to support the entire carbon ribbon, and certainly, it also can be disposed as a short shaft to support one end of the carbon ribbon core, as shown in FIG. 7, which is a schematic view of the structure of the carbon ribbon recovery roller in Embodiment 3 of the present invention.

Figure 8:
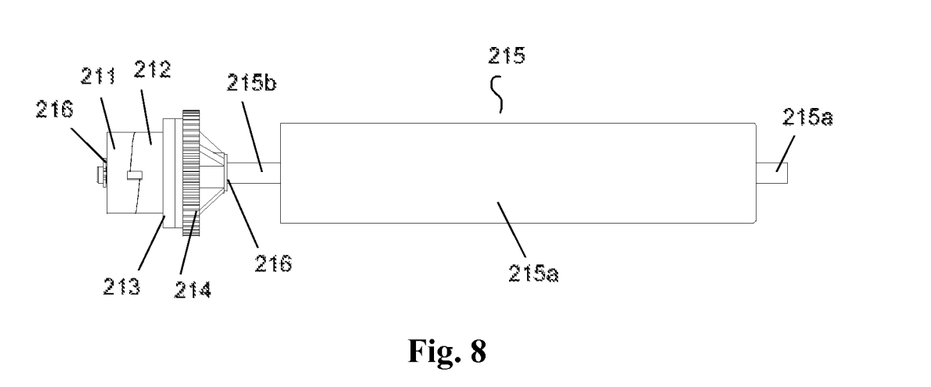
FIG. 8 is a schematic view of the structure of the carbon ribbon recovery roller in Embodiment 4 of the present invention.

As shown in FIG. 8, it is a schematic view of the structure of the carbon ribbon recovery roller in Embodiment 4 of the present invention. On the basis of the above embodiments, in this embodiment, the edges of the curved surface 2121 and the curved surface 2122 are disposed on the edges of the end surface 2124, in this manner, the semidiameter of the end surface 2124 appears to be the same as the distance of the out-side surfaces of the curved surface 2121 and the curved surface 2122 to the axis.

It can be seen that compared with the prior art, the above embodiments have fewer parts and components and a simple structure, which simplifies the assembly technology and reduces the hardware and labor costs. In addition, the matched structure of the clutch plates characterized by synchronized rotation when the clutch plates rotate in one direction reduces the retraction resistance when the carbon ribbon retracts.

It should be indicated that the printer having the above carbon ribbon recovery device also belongs to the scope protected by the present invention. The printer can be a thermal transfer printer or a thermal sublimation printer, comprising a main body and a housing, wherein the carbon ribbon recovery device is disposed in the main body and its positional relations with the other elements in the main body and with the housing are the same as or similar to conventional technology.

The above illustrations to the embodiments disclosed above enable the person skilled therein to accomplish or use the invention. Various modifications to these embodiments would be obvious for those skilled in the art, and the common principles defined in the text can be accomplished in other embodiments without departing from the spirit or scope of the present invention. Therefore, the present invention is not limited within these embodiments illustrated in the text, but covers the broadest scope conforming to the principles and novel characteristics disclosed in the text.

What is claimed is:

1. A carbon ribbon recovery device, comprising a carbon ribbon supply roller, a carbon ribbon recovery roller and a carbon ribbon driving device, wherein, the carbon ribbon recovery roller comprising:
   a first clutch plate, a second clutch plate, a friction element, a recovery gear and a spindle;
   wherein
   the spindle is provided on a frame of a printer and is adapted to support a carbon ribbon;
   the first clutch plate, the second clutch plate, the friction element and the recovery gear are arranged in turn on the spindle;
   the first clutch plate rotates synchronously with the spindle;
   the recovery gear, the friction element and the second clutch plate are rotatable around the spindle;
   the recovery gear is rotated by the carbon ribbon driving device to drive the friction element to rotate, then to provide the second clutch plate with a rotating force in the same direction;
   the second clutch plate is matched with the first clutch plate when the second clutch plate rotates in a predetermined direction, and the second clutch plate breaks away from a matched state with the first clutch plate when the second clutch plate rotates in a direction opposed to the predetermined direction.

2. The carbon ribbon recovery device according to claim 1, wherein, the first clutch plate is provided with at least one high point and one low point, and a transition between the high point and low point is uniform to form a first curved surface; the second clutch plate provided with at least one high point and one low point and a transition between the high point and low point is also uniform to form a second curved surface; and the first curved surface and the second curved surface are matched with one another.

3. The carbon ribbon recovery device according to claim 2, wherein, the first clutch plate comprises a first mounting hole, a first end surface and two first curved surfaces;
   wherein
   the two first curved surfaces are connected end to end, and uniformly distributed on the first end surface taking the first mounting hole as a circle center;
   the first mounting hole is located at a center of the first clutch plate, and a shape of its cross section is matched with a shape of the spindle.

4. The carbon ribbon recovery device according to claim 3, the second clutch plate comprises a second mounting hole, a second end surface and two second curved surfaces;
   wherein
   the two second curved surfaces are connected end to end, and uniformly distributed on the second end surface taking the second mounting hole as a circle center;
   the second mounting hole is located at a center of the second clutch plate, and a shape of its cross section is matched with the shape of the spindle.

5. The carbon ribbon recovery device according to claim 2, wherein, the second clutch plate comprises a second mounting hole, a second end surface and two second curved surfaces;
   wherein
   the two second curved surfaces are connected end to end, and uniformly distributed on the second end surface taking the second mounting hole as a circle center;
   the second mounting hole is located at a center of the second clutch plate, and a shape of its cross section is matched with the shape of the spindle.

6. The carbon ribbon recovery device according to claim 2, wherein the first curved surface and the second curved surface are helical surfaces or inclined surfaces.

7. The carbon ribbon recovery device according to claim 1, wherein one end of the spindle adjacent to the carbon ribbon only supports one end of a carbon ribbon core.

8. The carbon ribbon recovery device according to claim 1, wherein one end of the spindle adjacent to the carbon ribbon runs through a carbon ribbon core.

9. The carbon ribbon recovery device according to claim 1, wherein the friction element is a felt pad.

10. The carbon ribbon recovery device according to claim 1, wherein a material of the first clutch plate or the second clutch plate is plastic, or metal or alloy having good elastic property.

11. A printer having the carbon ribbon recovery device according to claim 1.

12. The printer according to claim 11, wherein, the first clutch plate is provided with at least one high point and one low point, and the transition between the high point and low point is uniform to form a first curved surface; the second clutch plate provided with at least one high point and one low point and the transition between the high point and low point is also uniform to form a second curved surface; and the first curved surface and the second curved surface are matched with one another.

13. The printer according to claim 12, wherein the first clutch plate comprises a first mounting hole, a first end surface and two first curved surfaces;
   wherein
   the two first curved surfaces are connected end to end, and uniformly distributed on the first end surface taking the first mounting hole as a circle center;
   the first mounting hole is located at a center of the first clutch plate, and a shape of its cross section is matched with a shape of the spindle.

14. The printer according to claim 12, wherein the second clutch plate comprises a second mounting hole, a second end surface and two second curved surfaces; wherein
   the two second curved surfaces are connected end to end, and uniformly distributed on the second end surface taking the second mounting hole as a circle center;

the second mounting hole is located at a center of the second clutch plate, and a shape of its cross section is matched with the shape of the spindle.

15. The printer according to claim 12, wherein the first curved surface and the second curved surface are helical surfaces or inclined surfaces.

16. The printer according to claim 11, wherein one end of the spindle adjacent to the carbon ribbon only supports one end of a carbon ribbon core.

17. The printer according to claim 11, wherein one end of the spindle adjacent to the carbon ribbon runs through the carbon ribbon core.

18. The printer according to claim 11, wherein the friction element is a felt pad.

19. The printer according to claim 11, wherein a material of the first clutch plate or the second clutch plate is plastic, or metal or alloy having good elastic property.

* * * * *